United States Patent

Heinze et al.

[11] 4,056,370
[45] Nov. 1, 1977

[54] ZEOLITE A WITH IMPROVED PROPERTIES

[75] Inventors: Gerhard Heinze, Schildgen; Manfred Mengel, Cologne; Gerhard Reiss, Leverkusen, all of Germany

[73] Assignee: Bayer Aktiengesellschaft, Leverkusen, Germany

[21] Appl. No.: 620,723

[22] Filed: Oct. 7, 1975

Related U.S. Application Data

[62] Division of Ser. No. 472,387, May 22, 1974, abandoned.

[30] Foreign Application Priority Data

June 7, 1973 Germany .............................. 2329210

[51] Int. Cl.$^2$ ............................................. B01D 53/04
[52] U.S. Cl. ........................................ 55/68; 55/75
[58] Field of Search ............... 55/68, 75; 252/455 Z; 423/328, 329, 330

[56] References Cited

U.S. PATENT DOCUMENTS

| | | | |
|---|---|---|---|
| 2,882,243 | 4/1959 | Milton | 55/75 X |
| 2,908,549 | 10/1959 | Estes | 423/328 |
| 3,085,379 | 4/1963 | Kiyonaga et al. | 55/75 X |

*Primary Examiner*—Wilbur L. Bascomb, Jr.
*Assistant Examiner*—Robert H. Spitzer
*Attorney, Agent, or Firm*—Burgess, Dinklage & Sprung

[57] ABSTRACT

A type A zeolite corresponding to the formula
$x$ Me$^{II}$O $\cdot$ $n$ ME$^{I}_2$O $\cdot$ Al$_2$O$_3$ $\cdot$ (1.85 $\pm$ 0.5) SiO$_2$ in which
Me$^{I}$ is a monovalent metal;
Me$^{II}$ is a divalent metal;
$x$ has a value of at least 0.80; and $n$ has a value of (1.0 $\pm$ 0.2) $-$ $x$ is produced by treating a type Na-A zeolite with a solution of a divalent metal salt to replace sodium and introduce $x$ moles of the divalent metal. This introduces far more divalent metal than is needed for adsorption but the resulting zeolite does not undergo the loss in adsorptive capacity upon regeneration in the presence of water vapor which is exhibited by those of a lower degree of exchange. The new zeolites are particularly suitable for treatment of a mixture of substances comprising a polar or polarizable substances and less polar or less polarizable substances, a mixture of nitrogen and oxygen and a mixture of CO$_2$ with other gases.

4 Claims, 1 Drawing Figure

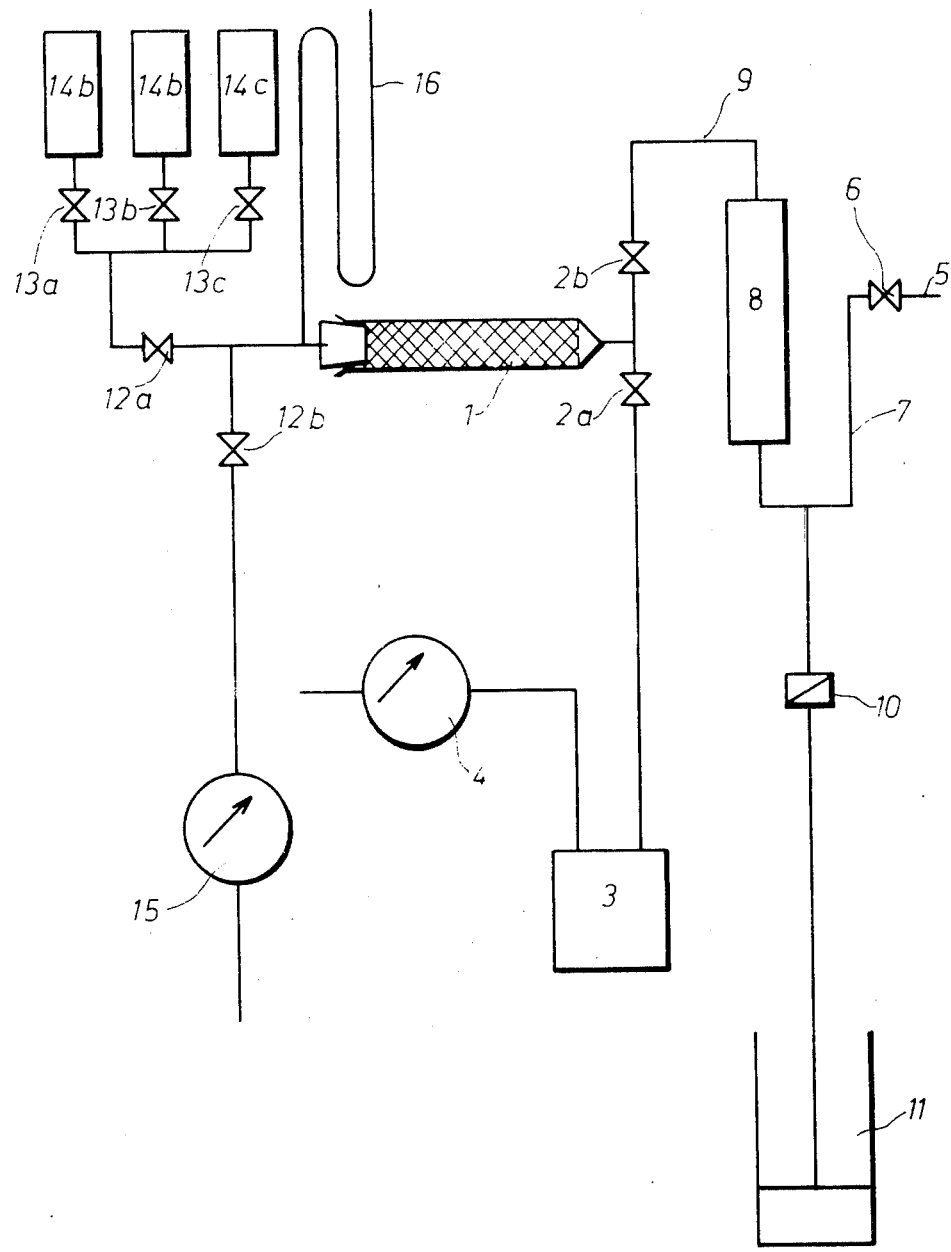

ZEOLITE A WITH IMPROVED PROPERTIES

This is a continuation division of Application Ser. No. 472,387, filed May 22, 1974, now abandoned.

Type A zeolites which correspond to the composition $$(1.0 \pm 0.2) M_{2/n}O \cdot Al_2O_3 \cdot (1.85 \pm 0.5) SiO_2$$

in which M is a metal and $n$ is its valence, are widely used for adsorption purposes. Type A zeolites after they have been processed with binders into pellet, bead or granular form, are primarily used for drying or for the fine purification of gas and liquid streams. Binder-free particles of zeolite A are also used.

In drying and fine-purification processes, relatively small quantities of $H_2O$ or other impurities, such as for example $CO_2$, $H_2S$, acetylene, $NH_3$ etc. are removed from fluids. If, by contrast, it is a question of separating components present in relatively high concentrations in the fluid by adsorption, the technique employed is known as mass separation.

The effect of type A zeolites in the aforementioned adsorption processes can be caused by two entirely different principles. Firstly, molecules differing from one another in their cross-sectional projection can be separated by allowing only the smaller molecules to pass through the zeolite pores of uniform size so that they have access to the actual adsorption cavities (sieve effect). Secondly, by virtue of the polar nature of the inner surface of the zeolite crystals, more polar molecules are adsorbed in preference to less polar molecules and more heavily polarizable molecules are adsorbed in preference to less polarizable molecules (polarity effect), providing the molecular configuration allows access through the zeolite pores. Some of the adsorption techniques practiced with zeolite A are based on the sieve effect, while others are based on the polarity effect; in some cases, both principles are simultaneously effective.

The pore width of type A zeolites can be influenced by the cations. When synthesized, zeolite A is generally obtained in the Na-form, which has a pore width of approximately 4 A. It is possible, by ion exchange, to introduce the more voluminous $K^+$-ions instead of the $Na^+$-ions, thus narrowing down the pores to around 3 A. On the other hand, if the $Na^+$-ions are exchanged for the divalent $Ca^{2+}$-ions, the pores are widened to around 5 A because, instead of two $Na^+$-ions, only one $Ca^{2+}$-ion with substantially the same ion radius enters the lattice. This change in pore width naturally influences the selectivity of the zeolites on account of the sieve effect, although it also alters other properties that are important so far as commercial application is concerned. Thus introduction of the divalent ions increases the polarity of the lattice, and a more rapid adsorption and desorption of the molecules is observed in consequence of the increase in pore width.

In the case of zeolite A, the increase in pore width obtained by introducing divalent ions is not proportional to the quantity of ions exchanged and instead takes place in jumps in a relatively narrow range of the degree of exchange. For example, as stated in German Patent Specification No. 1,215, 650 the increase in pore width from 4 to 5 A-units when the sodium ions are exchanged for calcium ions takes place within the narrow range of the degree of exchange of from 25 to 40% so that, if an exchange of only 25% or less takes place, the material has the sieve characteristic of sodium zeolite A, although if an exchange of 40% or more has taken place, the material has the sieve characteristic of calcium zeolite A. These limits can be displaced to a certain extent where other divalent ions are used.

In practice, the increase in pore widths of zeolite A from 4 A to 5 A is generally produced by ion exchange with calcium ions, the exchange process being continued far beyond the level of 40% required for pore widening for safety reasons. In general, these zeolites, known as "zeolite 5 A", have a degree of exchange of from 60 to 70%. Since, in the starting zeolite, not all the ion exchange sites are normally occupied by sodium ions, but to some extent by $H^+$-ions, the degree of exchange is not expressed as the number of $Na^+$-ions removed, but instead is defined as the molar ratio of $Ca^{2+}$ to $Al_2O_3$ in the zeolite.

In practice, type 5 A zeolites are used for the adsorption of straight-chain hydrocarbons, for drying gases, and for the adsorption of $CO_2$, CO, $N_2$, $NH_3$, etc. In some cases, zeolite 5 A competes with zeolites having a different effect pore width. This occurs, for example, in the adsorption of $CO_2$. Sodium zeolite A with a pore width of 4 A is used for removing $CO_2$ from natural gas in order to preclude the co-adsorption of propane and higher n-alkanes. By contrast, zeolite 5 A is preferred for removing $CO_2$ from combustion gases for the production of protecting gas, or for removing $CO_2$ from the intake air of air-separation plants because adsorption and desorption take place quickly through the wider pores, producing a shorter mass transfer zone which increases the economy of the process.

The performance of zeolites is assessed from equilibrium values of the charge as a function of temperature, known as adsorption isotherms. Before these isotherms are measured and, quite generally, before any adsorption process, the water present in the pores from production of the zeolite has first to be removed, which is done by heating and can be considerably accelerated by applying a vacuum or by using a dry purge gas. This process is known as "activation" or "regeneration".

Only small samples, for example 1 g or less, are used for measuring the adsorption isotherms and are generally activated in a high vacuum. This activation can be regarded as extremely careful and sparing.

By contrast, zeolites are rarely activated in vacuum on a commercial scale. Usually a hot gas is passed through the adsorber which supplies heat and simultaneously removes water vapor or other desorbates from the bed. If water vapor is desorbed, or if the activating gas as such is not dry, activation or regeneration of this kind is not as sparing as the high vacuum method used for measurement on a laboratory scale, because zeolites are sensitive to the simultaneous effect of water vapor and elevated temperatures, in other words they undergo a gradual change of the crystal lattice.

It is known that the method of activation influences the adsorption capacity of the zeolites. This applies in particular where adsorption is carried out at relatively low loadings, i.e., where substances which, basically, can only be adsorbed to a limited extent at the given temperature, such as for example $N_2$, $CH_4$ or CO, are adsorbed at temperatures far above the boiling point, for example at room temperature. The same applies at very low partial pressures as regards substances, which otherwise are highly adsorbable, such as for example $CO_2$ from atmospheric air. Accordingly, it is not surprising that the measured data of samples that have been sparingly activated on a laboratory scale using high vacuum cannot by any means be equated with the adsorption values of zeolites which have been subjected in industrial adsorbers to possibly repeated regeneration in the presence of water vapor.

It has been found that the adsorption capacity of a zeolite 5 A for $N_2$ at room temperature is adversely affected to a considerable extent by only a single activation at atmospheric pressure in the presence of water vapor, as opposed to vacuum activation, and can fall to less than half depending upon the period of exposure to water vapor. This phenomenon occurs not only in the case of Ca-containing type 5 A zeolites, but also in the case of type A zeolites exchanged with other divalent metals, for example with strontium.

However, processes for enriching oxygen from air require a $N_2$-loading as high as possible at room temperature. Processes of this kind have recently been acquiring a considerable significance. In practice enriched oxygen is required inter alia for oxidation reactions, for the production of hot flames and for fermentative processes, for example in the treatment of sewage.

Another process whose economy is dependent upon a high $N_2$-charge on the zeolite is the recovery of pure hydrogen from cracked ammonia gas. A similar problem is encountered in other processes for recovering hydrogen, in which traces of $N_2$, $CO_2$, CO and $CH_4$ have to be removed from a crude gas.

Accordingly, type 5 A zeolites of the kind used in adsorption installations for removing $N_2$ or other components with low adsorbability should be activated in vacuo in order to obtain an optimum effect. Although this is not difficult with small quantities, it does present problems on a commercial scale, both on account of the poor transfer of heat in a vacuum and on account of the expensive equipment. Another factor which has to be taken into consideration is that adsorber beds may have to be reactivated in situ if a certain amount of moisture has been accumulated.

Accordingly, the object of the invention is to provide a zeolite adsorbent which, following activation in a stream of hot air that need not necessarily have to be dried at all, has a high adsorption capacity at low charges.

It has now surprisingly been found that type 5 A zeolites whose degree of exchange, at a level of at least 80%, is far above the limit required for pore widening, are far less sensitive to activation with hot gases than standard commercial 5 A zeolites. There is little point in raising the degree of exchange above about 90% since it does not further reduce the sensitivity of the zeolite to regeneration while it is significantly more time consuming.

Accordingly, the present invention provides type A zeolites corresponding to the general formula.

$$x Me^{II}O.n Me^I_2O.Al_2O_3.(1.85 \pm 0.5)SiO_2$$

in which:
$Me^I$ is a monovalent metal, especially sodium;
$Me^{II}$ is a divalent metal;
$x$ has a value of at least 0.80; and
$n$ has a value of $(1.0 \pm 0.2) - x$.

Zeolites of this kind are eminently suitable for separating polar or polarizable molecules from less polar or less polarizable molecules.

$Me^{II}$ can be, for example, one or more of Mg, Ca, Sr or a dilavent metal from the series of Secondary Group Elements of the Periodic System, for example Mn. Calcium is preferred both because of its low price and because of the favorable position of the ion-exchange equilibrium.

The zeolites according to the invention are best prepared from sodium zeolite A either in powder form or in the form of shaped particles. The material is subjected to the exchange, for example with calcium salt solutions, in aqueous suspension. The ion exchange can take place either at room temperature or at an elevated temperature, any increase in temperature leading to higher degrees of exchange under otherwise constant reaction conditions. The concentration of the exchange solution is generally between 0.1 M and 3 M of calcium. Although low concentrations lead to higher degrees of exchange, they naturally give lower volume yields. In the case of powder samples, ion exchange is complete within an hour. Shaped particles require reaction times of up to about 8 hours, depending upon their size and porosity. Several exchange stages can be carried out in succession to obtain the degree of exchange according to the invention.

The difference in adsorption behavior between the zeolites according to the invention having a degree of exchange of at least 80% of divalent cations and the conventional 5 A zeolites having a lower degree of exchange, can be demonstrated by isotherm measurements. For example, $N_2$-charges were measured with a quartz spring balance according to McBain on binderfree zeolite A granulates with different Ca-exchange degrees of 83% (sample 1) and 73% (sample 2) in dependence upon the pretreatment. The exchange products were prepared from the same batch of Na zeolite A granulate. The samples were first activated for 8 hours at 350° C at an absolute presence of 0.5 mm Hg, the container being filled three times with dry helium and evacuated again towards the end of activation in order to flush out residual traces of $H_2O$. After the first measurement, the samples were then exposed to a moist hot gas stream in order to simulate practical activating conditions. For this purpose, air heated to 300° C, which had been saturated with water vapor at 20° C, was passed over the sample for 4 hours. Thereafter the sample was activated in vacuo in the same way as for the first measurement in order to obtain a comparable anhydrous state for the second measurement. The following measured data demonstrate the superiority of the sample exchanged to a degree of more than 80%:

| Sample | Treatment | $N_2$-absorption at 0° C in g/100 g | |
|---|---|---|---|
| | | 800 mg Hg | 100 mm Hg |
| 1 | Activation in vacuo | 2.60 | 0.62 |
| 1 | Exposure to moist hot air, followed by activation in vacuo | 2.65 | 0.66 |
| 2 | Activation in vacuo | 2.29 | 0.63 |
| 2 | Exposure to moist hot air, followed by activation in vacuo | 1.90 | 0.34 |

The measurements of separation effects, degrees of enrichment and yields in cyclic adsorption processes, as described in the following Examples, are more indicative than these equilibrium measurements of absolute charges of pure gases. Since larger quantities of substances are used for those measurements, any uncertainties attributable to the lack of homogeneity of the sample are automatically eliminated. In addition, other properties of the zeolite which are also of importance so far as commercial application is concerned, namely their adsorption and desorption kinetics and the changes which they undergo, are also covered by dynamic measurement.

The invention will be further described hereinbelow with reference to the accompanying drawing which is a schematic view of an apparatus for testing the adsorptive capacities of the novel zeolites.

The process according to the invention is illustrated by the following Examples.

EXAMPLE 1

Production of Ca-Na-zeolite A with different degrees of exchange:

1a. 1200 g of binder-free Na-zeolite A bead granulate (1 to 4 mm sieve fraction), corresponding to 4.4 moles of sodium zeolite A, where introduced into a glass column and exchanged at 80° C with 7.0 liters of 1.25-molar $CaCl_2$-solution. The $CaCl_2$-solution was pump-circulated through the column continuously for a period of 3 hours. The solution was then run off and the procedure was repeated with 7.0 liters of fresh $CaCl_2$-solution (1.25 m) over a period of 3 hours at 80° C. The granulate was washed with water until free from chloride and was dried in air. The Ca-Na-zeolite A thus obtained had the following composition, based on anhydrous substance;

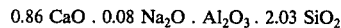

$0.86\ CaO\ .\ 0.08\ Na_2O\ .\ Al_2O_3\ .\ 2.03\ SiO_2$ 1 b. 1200 g of the same binder-free Na-zeolite A bead granulate as in Example 1 a) were exchanged with 1.5 liters of 1.2 molar $CaCl_2$-solution over a period of 1 hour at 50° C by pump-circulating the solution over the zeolite accommodated in a column as described in Example 1 a). The solution was then run off and the procedure was repeated with 1.5 liters of fresh $CaCl_2$-solution (1.2 m) which was pump-circulated over a period of 6 hours at a temperature of 50° C. The product obtained had the following composition, based on anhydrous substance:

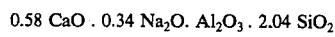

$0.58\ CaO\ .\ 0.34\ Na_2O.\ Al_2O_3\ .\ 2.04\ SiO_2$

EXAMPLE 2

The two type A Ca-Na-zeolites produced in accordance with Examples 1a) and 1 b) were tested in the apparatus described below for their adsorption capacity in the enrichment of oxygen from air at room temperature. The samples were activated before the actual test, initially by heating in a tube provided with an electrical heating coil under an absolute pressure of 1 mm Hg. A cooled zeolite column was installed between the heating tube and the vacuum pump for receiving the desorbed water vapor. The final activation temperature was 320° C and was kept constant over a period of 2 hours.

The samples were then subjected to the first capacity measurement (as described herein below) and thereafter, spread out in a dish, were left standing for 3 days in the ambient air for saturation with water vapor.

They were then reactivated, on this occasion, however, with hot gas following the practice normally adopted in industrial adsorbers. For this purpose, the granulate was introduced into a heat-insulated column and was percolated by hot air which has been adjusted to a dew point of +20° C by moistening in a water saturator. After a temperature of 300° C had been reached the water saturator was by passed by a by pass pipe and activation was continued for 2 hours at 320° C with carefully dried air in order to guarantee a residual water charge on the zeolite comparable with vacuum activation.

The actual capacity measurement of the zeolite was carried out in the apparatus illustrated in the accompanying drawing. In the drawing, the reference 1 denotes a container for the zeolite batch to be tested. It has an internal diameter of 48 mm, a length of the cylindrical section of 690 mm and a useful volume of 1250 ml. The inlet end of the test tube can be connected through a shut-off valve 2(a) to a vacuum pump 3 whose gas outlet is connected to a gas meter 4 in order to measure the quantity of gas pumped out. Alternatively, the inlet end of the test tube can be connected through a shut-off valve 2(b) to a source of dried air. The dried compressed air coming from a pipe 5 is expanded in a reducing valve 6 and flows into the test tube 1 through a pipe 7, a buffer vessel 8, a pipe 9 and the shut-off valve 2(b). In addition, the pipe 7 is connected to a non-return valve 10 which leads to an immersion vessel 11 by means of which the required adsorption pressure can be precision-adjusted through the height of the column of liquid in the vessel 11. In the tests, the pressure amounted to 20 mm Hg above atmospheric pressure.

The outlet end of the test tube 1 may be connected through a shut-off valve 12(a) and shut-off valves 13a, 13b and 13(c) to calibrated gasometers 14a, 14b and 14(c). Alternatively, the quantity of gas flowing out of the test tube can be diverted through a shut-off valve 12(b) to a gas meter 15. The pressure or the vacuum prevailing at the outlet end of the test tube is measured by a mercury manometer 16.

After the zeolite has been introduced into the container and the reducing valve 6 has been adjusted in such a way that a stream of gas bubbles escapes through the immersion vessel 11, the adsorption-desorption cycle, consisting of the phase (A) evacuation (B) filling to adsorption pressure and (C) flowover at constant pressure, is carried out as follows: A) Evacuation:

With the valves 2(b), 12(a) and 12(b) closed and the valve 2(a) open, the container is evacuated by the vacuum pump 3 to a constant pressure of 95 mm Hg (=⅛ atmosphere) and the valve 2(a) is then closed. The quantity of gas pumped off during evacuation is measured by the gas meter 4. B) Filling to adsorption pressure:

Dried air is allowed to enter the container by slowly opening the valve 2(b). Filling is complete when gas bubbles again escape from the pipe leading into the immersion vessel. C) Flowover at constant pressure:

With the valves 2(a), 12(a) 12(b) closed and the valve 2(b) open from the preceding phase, valve 12(b) is now opened and air is allowed to flow over the zeolite until the gas meter 15 indicates a gas output of 5 liters. Valve 2(b) is then closed, followed by valve 12(b).

This cycle is repeated a few times until the volume of gas pumped off during evacuation, as measured by the gas meter 4, gives completely constant valves. In the third phase of a cycle, the gas issuing from the test column is not passed through the gas meter as described above, but instead with valve 12(b) closed and valves 12(a) and 13(a) open, is passed into the gasometer 14(a) until a predetermined quantity of gas, for example 3 liters, has been collected. Thereafter, the gas stream is diverted, for example, to gaseometer 14(b) and another 2 liters is collected so that, overall, 5 liters of outlet gas are removed in this cycle as well. The content of the gasometer is analyzed for its oxygen content (in % by volume). The cycle can meanwhile be continued in the same way as described above and collection of the gas is optionally repeated for analysis. The individual phases take from about 30 seconds to 1 minute.

The tests are evaluated by determining the average concentration of 5 liters of product gas which, if component quantities are separately analyzed, may be calculated from the individual results. Since the evaluation of $O_2$-$N_2$-mixtures is not proportional to the $O_2$-content, the quantity of "separated nitrogen" is determined as a measure of the enrichment effect in accordance with the procedure normally adopted in air separation processes. This figure is a measure of the separating effect obtained and is derived from the following formula:

$$b = a (0.0476 x - 1)$$

in which:

$b$ = the quantity of $N_2$ separated [N liters];
$a$ = quantity of gas [N liters]; and
$x$ = $O_2$-content [% by volume]

On the other hand, the quotient of the quantity of gas pumped off and the $N_2$ separated puts the pumping energy expended in a ratio to the separating effect obtained. Accordingly, this quotient should have low values. Measured data $O_2$-enrichment tests with the two products produced in accordance with Examples 1(a) and 1(b) are compared with one another in the following table: wherein all the measurements were carried out twice:

minimum partial pressures. This system has acquired considerable practical significance for purifying the intake air of air separation plants employing the Linde principle.

The test was carried out in a test column 21 mm in diameter with a bed length of 1500 mm. A product of the following composition was used as zeolite for the process according to the invention:

Sample 1: 0.84 CaO . 0.13 $Na_2O$ . $Al_2O_3$ . 2.16 $SiO_2$.

A low-exchange zeolite of the following composition was also measured for comparison:

Sample 2: 0.75 CaO . 0.18 $Na_2O$ . $Al_2O_3$. 1.99 $SiO_2$.

The zeolite granulates were activated with carefully dried hot air at 300° C (dew point below − 70° C). The test gas was dried air at 23° C/6.5 atms. with a $CO_2$-content of 420 vol.-ppm. The rate of flow amounted to 20.5 cm/second, based on the empty column.

The test was evaluated by measuring the quantity of purified air with a gas meter after the zeolite column. The average $CO_2$-charge of the zeolite, the so-called "breakthrough charge", which is a factor of crucial importance in the design of industrial adsorbers, can be calculated from the quantity of air purified up to the breakthrough of 1 ppm of $CO_2$. It is also possible to determine the length of the mass transfer zone (MTZ) by means of a number of gas-analysis outlets distributed over the length of the column. The test results quoted below demonstrate the clear superiority of the type 5 A zeolite according to the invention having a degree of ion exchange of more than 80%:

| 1 Product | 2 Quantity | 3 % by volume of $O_2$ in the liters 1+2+3 | 4 4+5 | 5 % by volume of $O_2$ average | 6 $N_2$ separated N liters | 7 gas pumped off N liters | 8 quotient columns 7 : 6 |
|---|---|---|---|---|---|---|---|
| Example 1 a) Vacuum activation | 872 | 48.4 | 26.2 | 39.5 | 4.40 | 9.07 | 2.06 |
|  |  | 48.6 | 26.4 | 39.7 | 4.45 | 9.15 | 2.06 |
| Activation with moist hot air | 874 | 47.0 | 25.4 | 38.4 | 4.14 | 8.19 | 1.98 |
|  |  | 47.2 | 25.4 | 38.5 | 4.16 | 8.24 | 1.98 |
| Example 1 b) Vacuum activation | 862 | 49.0 | 26.6 | 40.0 | 4.51 | 9.14 | 2.03 |
|  |  | 49.0 | 26.6 | 40.0 | 4.51 | 9.18 | 2.04 |
| Activation with moist hot air | 868 | 40.0 | 23.2 | 33.3 | 2.93 | 6.56 | 2.24 |
|  |  | 40.2 | 23.4 | 33.5 | 2.96 | 6.58 | 2.22 |

The two products of Examples 1(a) and 1(b), which are produced from the same starting material and hence are also comparable in regard to grain-size spectrum, macroporosity and apparent density, hardly differ from one another after the sparing activation in vacuo. The differences only come to light after the damaging influence of water vapor at elevated temperature. Whereas the first highly exchanged product according to Example 1(a) shows only a negligible decrease in its separating effect, the product of Example 1(b) with a lower degree of exchange shows a marked drop in its separating effect.

EXAMPLE 3

In this Example, the type 5 A zeolites according to the invention having a degree of exchange by divalent cations of at least 80% were tested for the removal of traces of $CO_2$ from air, a typical fine-purification process in which a polarizable component is removed at

| Product | Quantity g | Breakthrough charge g $CO_2$/100 g of zeolite | length of MTZ cm |
|---|---|---|---|
| Sample 1 | 398 | 2.72 | 60 |
| Sample 2 | 380 | 1.90 | 92 |

It will be appreciated that the instant specification and examples are set forth by way of illustration and not limitation, and that various modifications and changes may be made without departing from the spirit and scope of the present invention.

We claim:

1. A process for separating a mixture of substances, comprising treating a type Na-A zeolite with a solution of a calcium salt to replace sodium and introduce $x$ moles of calcium, the zeolite then having the formula $$x\text{CaO} . n\text{Na}_2\text{O} . \text{Al}_2\text{O}_3 . (1.85 \pm 0.5) \text{SiO}_2$$

in which $x$ has a value of at least 0.80; and $n$ has a value of $(1.0 \pm 0.2) - x$, and contacting the modified zeolite with the mixture of substances selectively to adsorb on the zeolite predetermined ones of said substances, desorbing said substances, regenerating the zeolite in the presence of water vapor, the adsorptive capacity following regeneration remaining substantially as high as at the outset, and repeating the adsorption, desorption and regeneration.

2. A process as claimed in claim 1 wherein the mixture of substances comprises a mixture of polar or polarizable substances and less polar or less polarizable substances.

3. A process as claimed in claim 1 wherein the mixture of substances comprises a mixture of nitrogen and oxygen.

4. A process as claimed in claim 1 wherein the mixture of substances comprises a mixture of $CO_2$ with other gases.

* * * * *